United States Patent
Sakamoto et al.

(10) Patent No.: US 9,049,442 B2
(45) Date of Patent: Jun. 2, 2015

(54) MOVING IMAGE ENCODING APPARATUS AND METHOD FOR CONTROLLING THE SAME

(71) Applicant: CANON KABUSHIKI KAISHA, Tokyo (JP)

(72) Inventors: Daisuke Sakamoto, Yokohama (JP); Yukifumi Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/192,314

(22) Filed: Feb. 27, 2014

(65) Prior Publication Data

US 2014/0270513 A1 Sep. 18, 2014

(30) Foreign Application Priority Data

Mar. 15, 2013 (JP) ................................. 2013-054133

(51) Int. Cl.
*G06K 9/00* (2006.01)
*H04N 19/107* (2014.01)
*H04N 19/52* (2014.01)
*H04N 19/186* (2014.01)
*H04N 19/146* (2014.01)
*H04N 19/523* (2014.01)

(52) U.S. Cl.
CPC ............. *H04N 19/107* (2014.11); *H04N 19/52* (2014.11); *H04N 19/186* (2014.11); *H04N 19/146* (2014.11); *H04N 19/523* (2014.11)

(58) Field of Classification Search
USPC .................................. 382/162, 166, 232, 233
See application file for complete search history.

(56) References Cited

U.S. PATENT DOCUMENTS 5,229,850 A * 7/1993 Toyoshima ................... 348/153

FOREIGN PATENT DOCUMENTS

| JP | 2008-124937 A | 5/2008 |
| JP | 2008-172599 A | 7/2008 |
| JP | 2010-110006 A | 5/2010 |

* cited by examiner

*Primary Examiner* — Duy M Dang
(74) *Attorney, Agent, or Firm* — Cowan, Liebowitz & Latman, P.C.

(57) ABSTRACT

A technique is provided that can record moving images while not resulting in calculation load increase and maintaining a certain degree of image quality even when encoding corresponding to a 4:4:4 format. Provisional encoding is performed, by obtaining motion vectors in accordance with a plurality of mutually different search ranges of image data of one color component, on a preset number of frame images at an initial stage at a time when an encoding start instruction is given. Moreover, the search range having the smallest error vector among each of the search ranges is determined as a search range for a motion vector, for each color component in main encoding processing carried out following provisional encoding.

20 Claims, 13 Drawing Sheets

MOVING IMAGE ENCODING APPARATUS AND METHOD FOR CONTROLLING THE SAME

BACKGROUND OF THE INVENTION

1. Field of the Invention

The present invention relates to a technique for encoding moving images.

2. Description of the Related Art

Currently, digital devices capable of recording moving images, such as digital video cameras, and hard disk recorders, are widespread. In order to efficiently record moving images having a large amount of information in a recording medium such as a flash memory or a hard disk with limited capacity, these digital devices compress and encode moving image data.

Various methods have been proposed and become standardized as moving image compression/encoding methods. Typical moving image compression/encoding methods are the MPEG-2 encoding method and the H.264 encoding method. The MPEG-2 encoding method is an encoding method used for DVDs (Digital Versatile Discs) and the like. The H.264 encoding method is employed for AVCHD, which is a high-definition recording method for video cameras, and for 1seg broadcasting of terrestrial digital broadcasts. Both of these are widespread moving image compression/encoding methods.

YCbCr signals are used as input signals in such encoding methods. A YCbCr signal is obtained by performing color space conversion on an RGB signal to obtain a luminance signal Y and two color difference signals Cb and Cr.

Since the color difference signals Cb and Cr are lower in visibility than the luminance signal Y, even if their resolution is reduced, there is little visual influence. Therefore, it is possible to reduce the amount of information by down-sampling the color difference signals. A YCbCr 4:2:2 format reducing by one-half the number of pixels of color difference signals in the horizontal direction, and a YCbCr 4:2:0 format reducing by one-half the number of pixels both in the horizontal direction and in the vertical direction are examples of formats that reduce the amount of information.

In image encoding apparatuses, it is possible to reduce the amount of code, or reduce the various amounts of processing at the time of encoding using this YCbCr 4:2:2 format or YCbCr 4:2:0 format.

On the other hand, with an increase in resolution and an increase in gradation of displays and video cameras in recent years, encoding methods for encoding RGB signals directly, and providing encoded images with higher quality are also standardized. An RGB signal has the same number of pixels in each plane of RGB, and is also referred to as a signal of an RGB 4:4:4 format. Examples of encoding apparatuses encoding signals of the RGB 4:4:4 format include the apparatus disclosed in Japanese Patent Laid-Open No. 2008-172599 (Patent document 1), or Japanese Patent Laid-Open No. 2010-110006 (Patent document 2).

Meanwhile, in moving image recording with conventional MPEG methods, encoding is provisionally performed using images input prior to the encoding of images (hereinafter, this encoding operation is referred to as "provisional encoding"). Moreover, a technique to adequately control the amount of code of the subsequent stream to be recorded using the result of the amount of generated code and the like at the time of the provisional encoding has been proposed. An example for this is Japanese Patent Laid-Open No. 2008-124937 (Patent document 3). By the adoption of such provisional encoding, an improvement in the image quality of encoded images is achieved.

Processing on a sequence to be encoded is performed for each plane in encoding processing of encoding methods corresponding to the 4:4:4 format. Therefore, the processing amount is huge, and it is possible that frame processing is not finished during a predetermined period (for example, vertical synchronization time) relative to a moving image. Therefore, although it is important to maintain or improve image quality while reducing calculation processing, no technique to meet such a demand has been established so far.

SUMMARY OF THE INVENTION

The present invention has been made in view of the above-described problems. The present invention provides a technique that can record moving images while not resulting in calculation load increase and maintaining a certain degree of image quality even when performing encoding corresponding to the 4:4:4 format.

In order to solve this problem, for example, a moving image encoding apparatus described herein includes the following configuration. That is, there is provided a moving image encoding apparatus that encodes each frame image constituting a moving image independently for each color component. The moving image encoding apparatus includes: a provisional encoding unit that performs, by obtaining motion vectors in accordance with a plurality of mutually different search ranges of image data of one color component, provisional encoding on a preset number of frame images at an initial stage at a time when an encoding start instruction is given; and a determination unit that determines, from the plurality of search ranges, the search range corresponding to the smallest error vector as a search range for a motion vector, of each color component in main encoding processing carried out following the provisional encoding.

Further features of the present invention will become apparent from the following description of exemplary embodiments (with reference to the attached drawings).

DESCRIPTION OF THE EMBODIMENTS

Hereinafter, Embodiments according to the present invention will now be described in detail with reference to the drawings. In the embodiments described below, although an image encoding apparatus mounted on a video camera will be described, the device on which the image encoding apparatus is mounted is not particularly restricted and may also be a video cassette recorder or the like.

[First Embodiment]

Figure 1:
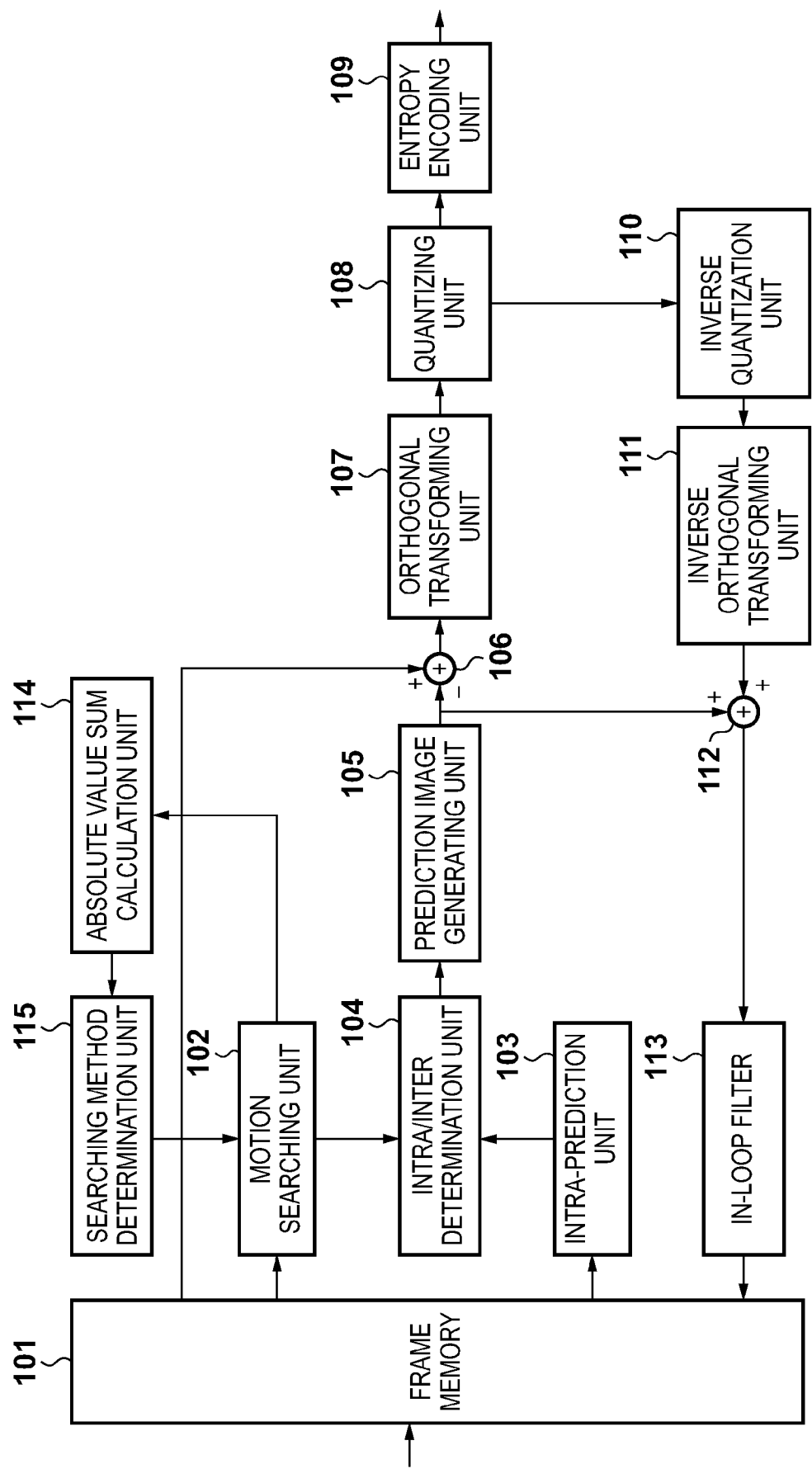
FIG. 1 is a block diagram showing a configuration example of a moving image encoding apparatus according to a first embodiment.

FIG. 1 is a block diagram showing a configuration example of a moving image encoding apparatus according to the present embodiment.

An apparatus according to an embodiment includes a frame memory 101, a motion searching unit 102, an intra-prediction unit 103, an intra/inter determination unit 104, a prediction image generating unit 105, a subtractor 106, an orthogonal transforming unit 107, a quantizing unit 108, and an entropy encoding unit 109. Furthermore, this apparatus includes an inverse quantization unit 110, an inverse orthogonal transforming unit 111, an adder 112, an in-loop filter 113, an absolute value sum calculation unit 114, and a searching method determination unit 115.

In motion search determining motion vectors used for motion compensation, block matching methods are generally used. Block matching processing performed in the motion searching unit 102 will be described with reference to FIG. 2.

Figure 2:
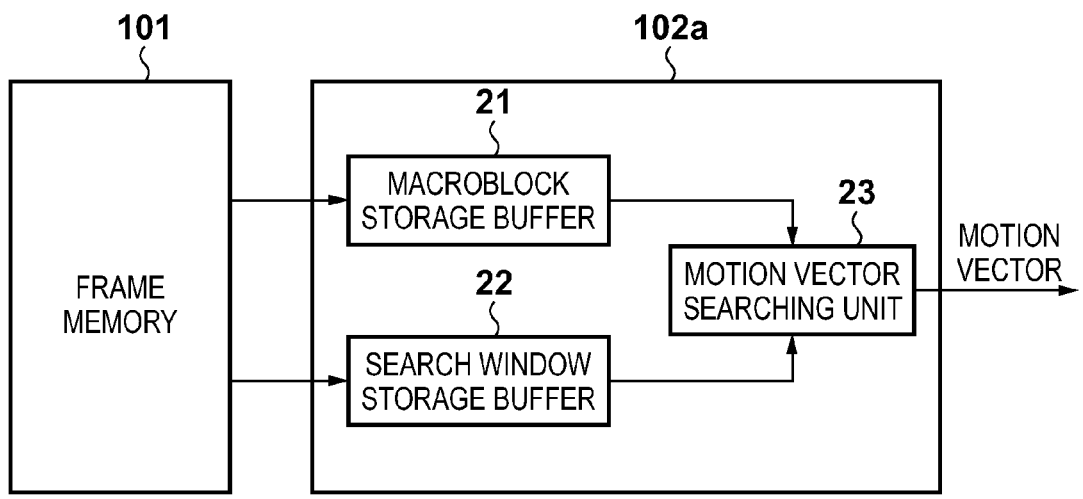
FIG. 2 is a block diagram showing one example of a configuration of a motion searching unit.

FIG. 2 is a block diagram showing a motion search processing unit 102a using a block matching method in the motion searching unit 102. In FIG. 2, the motion search processing unit 102a includes a macroblock storage buffer 21, a search window storage buffer 22, and a motion vector searching unit 23. The macroblock storage buffer 21 stores the image of the current macroblock to be encoded that is read from the frame memory 101. A "macroblock" is a pixel block to be encoded that is made up of a plurality of pixels. The search window storage buffer 22 sets the center of a search area at the center of the current macroblock, reads, from the frame memory 101, images corresponding to the range (hereinafter, referred to as a search window) of the search area, and stores them. The motion vector searching unit 23 searches in the search window for a macroblock similar to the current macroblock, and determines, as a final motion vector, information specifying the position of the similar macroblock. In order to determine a motion vector, a valuation function such as the following MSE (Mean Square Error) or MAE (Mean Absolute Error), or MAD (Mean Absolute differences) is used.

$$MSE = \Sigma_{x=0}^{16} \Sigma_{y=0}^{16} \{S_{cur,k}(x,y) - S_{ref}(x+t,y+j)\}^2$$

$$(-X \leq 1 \leq X, -Y \leq 1 \leq Y)$$

$$MAE = \Sigma_{x=0}^{16} \Sigma_{y=0}^{16} |S_{cur,k}(x,y) - S_{ref}(x+t,y+j)|$$

$$(-X \leq 1 \leq X, -Y \leq 1 \leq Y)$$

Here, $S_{ref}$ represents reference blocks in a reference frame image, and $S_{cur,k}$ represents the k-th macroblock of the current frame image. In addition, (x,y) denotes the coordinates of pixels in a macroblock of 16×16 pixels. (i, j) represents a spatial position of a reference frame/field relative to the k-th macroblock of the current frame. Furthermore, if X and Y, respectively, are defined as the numbers of horizontal and vertical pixels of the search window, then (i, j) are in the range of $-X \leq i \leq X$, and $-Y \leq j \leq Y$, respectively. These valuation functions are based on pixel errors, and the (i, j) having the lowest MAE value or MSE value is determined as the final motion vector of the current macroblock (hereinafter, this method is referred to as the "origin searching method", and a searching device using this method is referred to as an "origin searching device").

Figure 3:
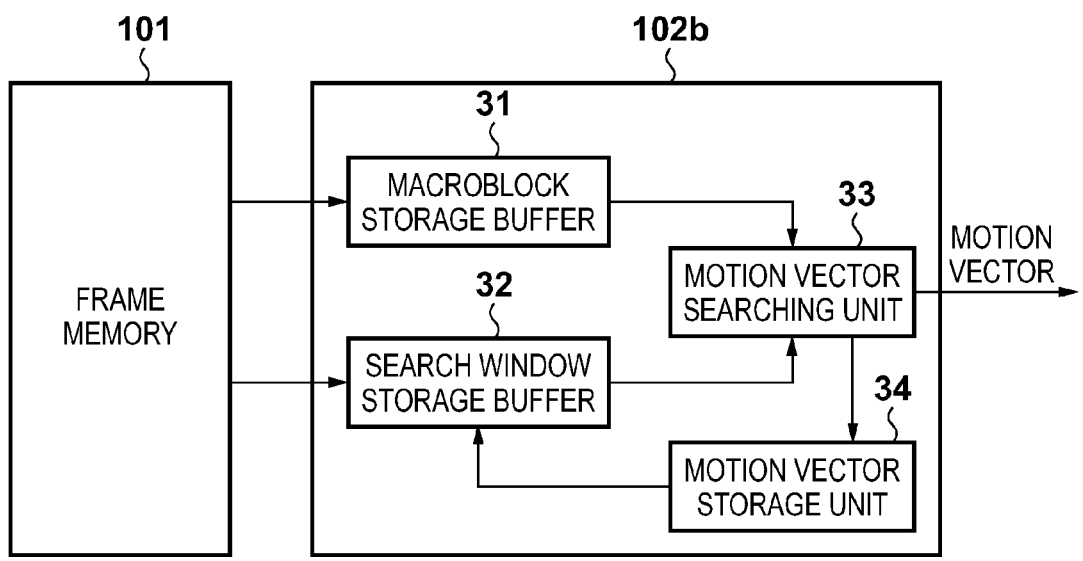
FIG. 3 is a block diagram showing another example of a configuration of a motion searching unit.

Furthermore, FIG. 3 is a block diagram of a motion search processing unit 102b using a block matching method in the motion searching unit 102. In FIG. 3, reference numerals 31 to 33 are the same as reference numerals 21 to 23 in FIG. 2. However, the motion search processing unit 102b includes a motion vector storage unit 34 storing the motion vector determined by the motion vector searching unit 33. Moreover, the macroblock storage buffer 31 stores the image of a search range centered around a position indicated by the motion vector of the immediately previous macroblock stored in the motion vector storage unit 34. Therefore, the motion vector searching unit 33 searches for a macroblock similar to the current macroblock to be encoded, from a search range centered around a position searching for the vector of the immediately previous macroblock (hereinafter, this method is referred to as "peripheral MB vector searching method", and its device is referred to as a "peripheral MB vector searching device").

The motion searching methods described above are currently used in the international standard methods H.261, H.263, MPEG1, MPEG2, and MPEG4, and are the most widely adopted motion searching methods.

Furthermore, there is also a method in which the center position of the search window is set at a position that is shifted, by a global vector, from the current macroblock while generating the reduced image of an input frame, and detecting, in advance, the global vector representing the motion of the entire screen using the reduced image (hereinafter, this method is referred to as "global vector searching method", and its device is referred to as a "global vector searching device"). This global vector searching method is convenient for cases in which an acceleration sensor or the like detecting the direction of a camera is mounted on a video camera. This is because it is possible to set the center position of the search window based on a signal from the acceleration sensor.

Figure 4:
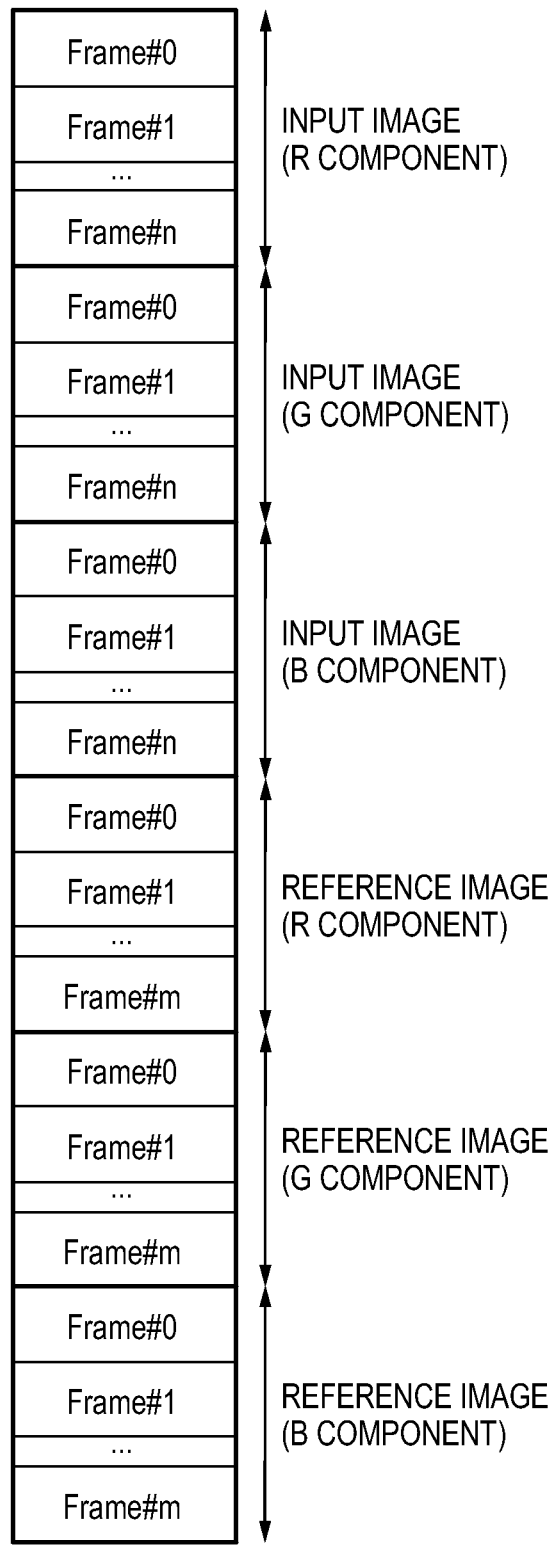
FIG. 4 is a block diagram showing an example of area division of a frame memory according to the first embodiment.

FIG. 4 is a diagram showing an example of area division of the frame memory 101. The frame memory 101 is divided so that an input image area and a reference image area described below may store a plurality of frames for each component.

The frame memory 101 stores moving image RGB signals of the 4:4:4 format obtained by imaging with an image sensing device such as a CCD (not shown), sequentially in the input image areas for each color component.

The searching method determination unit 115 sets, in the motion searching unit 102, a motion searching method determined at the time of provisional encoding. The details of determining the motion searching method at the time of provisional encoding will be described below.

The motion searching unit 102 selects the image of the current macroblock from the input image area of the frame memory 101, selects a searching method set by the searching method determination unit 115 from a plurality of searching methods, reads a corresponding image of the search window from the reference image area, and performs motion search.

Although the searching method set by the searching method determination unit 115 refers to, for example, the origin searching method, the peripheral MB vector searching method, the global vector searching method, or the like described above, any method may be used. A position of high correlation is determined as a motion vector by block matching between image data in the search range and the image data of the block to be encoded, and the intra/inter determination unit 104 is notified of the result. In addition, the intra/inter determination unit 104 is simultaneously notified of the sum of absolute differences between the pixels of the current macroblock and the pixels of the reference image at the position of the motion vector.

The intra-prediction unit 103 reads the image data of a block to be encoded from the input image area of the frame memory 101, selects an intra-prediction method based on the correlation between the image data and a plurality of pieces of intra-prediction image data generated from the image data around an already encoded block, and notifies the intra/inter determination unit 104 of the selected method. In addition, the intra-prediction unit 103 notifies the intra/inter determination unit 104 of the sum of absolute differences between the pixels of a prediction image by the selected intra-prediction method and the pixels of the current macroblock.

The intra/inter determination unit 104 inputs the sum of absolute differences of the motion searching unit 102 and the sum of absolute differences of the intra-prediction unit 103, selects the prediction method corresponding to the smaller sum, and notifies the prediction image generating unit 105 of the selected method. The prediction image generating unit 105 generates a prediction image in response to the input prediction method, and outputs the prediction image to a subtractor 106. The subtractor 106 calculates the difference between the image to be encoded and the prediction image, generates difference image data, and outputs the generated data to the orthogonal transforming unit 107.

The orthogonal transforming unit 107 performs orthogonal transformation on the input difference image data, generates orthogonal transformation coefficient data, and outputs the generated data to the quantizing unit 108. The quantizing unit 108 performs quantization processing on the orthogonal transformation coefficient data orthogonally transformed by the orthogonal transforming unit 107. Then, the entropy encoding unit 109 performs entropy encoding such as CAVLC, or CABAC on the transformation coefficients obtained by the quantization of the quantizing unit 108, and outputs the result as encoded data. The stream of encoded data generated by the entropy encoding unit 109 is written to a writable memory card or disk.

The transformation coefficient data quantized by the quantizing unit 108 is also supplied to the inverse quantization unit 110. The inverse quantization unit 110 inversely quantizes the input transformation coefficients. The inverse orthogonal transforming unit 111 performs inverse orthogonal transformation on the inversely quantized data, and generates difference image data. The inversely orthogonally transformed data and the prediction image data generated by the prediction image generating unit 105 are input to the adder 112 and are added. The added data corresponds to encoded reconstructed image data, is input to the above-described intra-prediction unit 103 and prediction image generating unit 105, and is used for generating intra-prediction image data.

Furthermore, the reconstructed image data is subjected to reduction processing of encoding distortion by the in-loop filter 113, and is stored in the reference image area of the frame memory 101 as reference image data used at the time of inter-encoding.

Next, provisional encoding in which motion searching method determination is performed that is a feature of the present embodiment will be described with reference to FIG. 5. Since an example of application to a video camera is described in this embodiment, the processing described below is performed using, as a trigger, the operation of a recording start button in an operation unit that is not shown.

Figure 5:
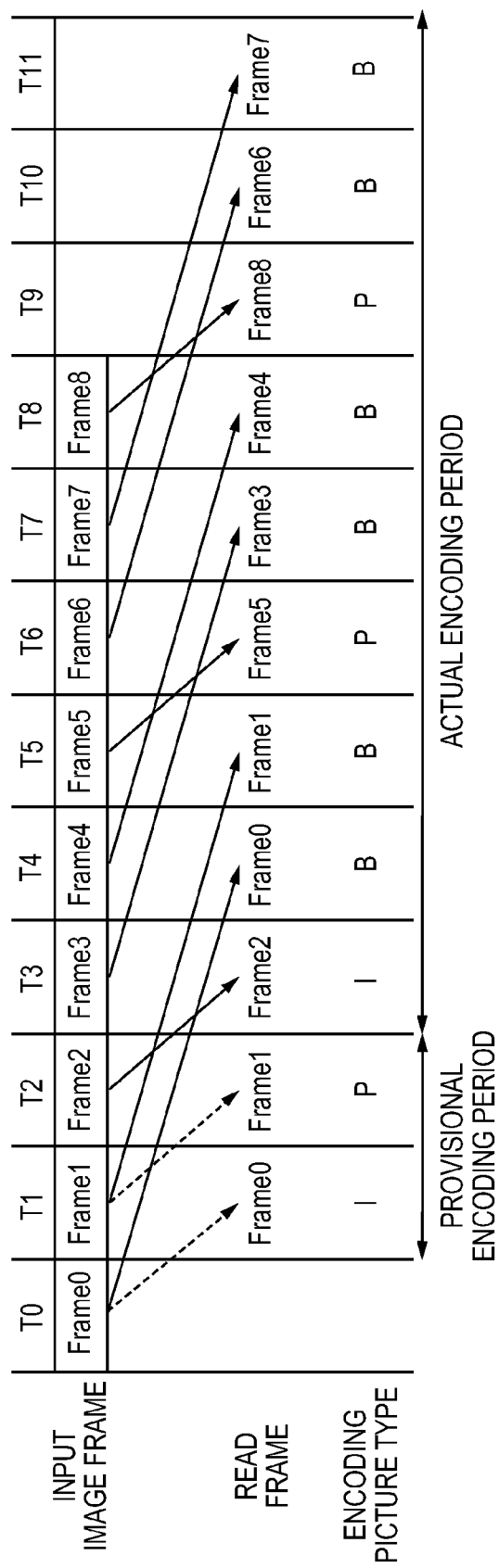
FIG. 5 is an operation timing chart of a moving image encoding apparatus according to an embodiment.

FIG. 5 is a timing diagram of processing of an encoding apparatus of the present invention. The horizontal axis represents the time axis, and each section represents one frame period of an image frame. Furthermore, T0 to T11 represent frame periods. Frame0 to Frame8 represent input frames stored in the input image area of the frame memory 101. Frame0 represents the frame that is first input at the start of encoding. In the present embodiment, one GOP (Group of Pictures) is defined as nine frames. If encoded pictures are arranged in order of encoding, then the pictures are "IBBPBBPBB". If encoded pictures are arranged in order of input, then the pictures are "BBIBBPBBP". The arrows in FIG. 5 associate a period in which an image is input with a period in which the image is read out, and represent a flow of image frames. The dashed line arrows represent a flow of data to be subjected to provisional encoding. A preset number of frame images at the initial stage at the time when the recording start button is operated are subjected to provisional encoding. Since this provisional encoding is carried out only to determine the motion searching method, the encoding carried out here is not recorded as a stream. In addition, motion searching method determination is carried out at the time of this provisional encoding. The solid line represents data at the time of main encoding, and the encoding here is recorded as a stream. Although in the present embodiment one GOP is defined as nine frames, even if one GOP has another number of frames, such as 15 frames, provisional encoding can be realized using a similar method. It should be noted that this is only an example.

Next, the motion searching method determination method that is a feature of this embodiment will be described with reference to FIG. 1 and FIG. 5.

In the period T0 in FIG. 5, the first image frame Frame0 immediately after the start of encoding is written to the frame memory 101. In this period, encoding processing is not performed.

Next, in the period T1, the image frame Frame1 is written to the frame memory 101. In the period T1, Frame0 is read from the frame memory 101, and provisional encoding as an I picture is performed. Here, in the period T1, at least the provisional intra-encoding of the G component of Frame0 may be performed. However, in the period T1, the provisional intra-encoding of the R component and the B component of Frame0 may also be performed. Although the encoding processing at the time of provisional encoding is almost the same as the above-described encoding processing, the result of the entropy encoding is not output as streams. Alternatively, entropy encoding is not performed. Next, in the period T2, Frame2 is written to the frame memory 101. In the period T2, Frame1 is read from the frame memory 101, and provisional encoding as a P picture is performed using a reference image of the G component of Frame0 subjected to provisional intra-encoding.

The searching method determination unit 115 first assigns to the motion searching unit 102 the searching method by performing motion search using the origin searching method.

The motion searching unit 102 reads the image of the current macroblock from the input image area of the G component of Frame1 from the frame memory 101, reads the image of a search window centered around the position of the current macroblock, of a reference image encoded during the T1 period from the reference image area of the G component of Frame1, and performs motion search. Then, the motion searching unit 102 notifies the absolute value sum calculation unit 114 of the sum of absolute differences (MAE indicated above) between the pixels of the current macroblock and the pixels of the reference image at the position of the motion vector. Encoding processing after motion search may be carried out or may not be carried out. When carried out before entropy encoding, the result subjected to encoding is not output as a stream.

The absolute value sum calculation unit 114 receives the sum of absolute differences in the unit of macroblock notified by the motion searching unit 102, and adds the sums corresponding to one frame of the G component. Then, the absolute value sum calculation unit 114 calculates the sums of absolute differences corresponding to one frame of the G component due to the origin searching method, and notifies the searching method determination unit 115 of the calculated sums.

The searching method determination unit 115 holds the sums of absolute differences notified by the absolute value sum calculation unit 114, and subsequently assigns to the motion searching unit 102 a searching method to perform motion search using the peripheral MB vector searching method.

In provisional encoding in the period T2, instead of performing the provisional encoding of the R and B components of Frame1 next, the provisional encoding of the G component as a P picture is performed again. That is, the provisional encoding of the G component a second time is performed using a time for which the encoding of the R or B component is possible. The motion searching unit 102 reads the image of the current macroblock from the input image area of not the R and B components but the G component in the frame memory 101 again. In addition, similarly, the motion searching unit 102 reads the image of a search window centered around the position of a motion vector obtained in the immediately previous macroblock, of a reference image encoded during the T1 period from the image reference area of the G component, and performs motion search. Then, the motion searching unit 102 notifies the absolute value sum calculation unit 114 of the sum of absolute differences between the pixels of the current macroblock and the pixels of the reference image at the position of the motion vector. Encoding processing after motion search may be carried out or may not be carried out. When carried out before entropy encoding, the encoded result is not output as a stream.

The absolute value sum calculation unit 114 receives the sum of absolute differences in units of macroblocks notified by the motion searching unit 102, and adds the sums corresponding to one frame of the G component. Then, the absolute value sum calculation unit 114 calculates the sums of absolute differences corresponding to one frame of the G component due to the peripheral MB vector searching method, and notifies the searching method determination unit 115 of the calculated sums.

The searching method determination unit 115 holds the sums of absolute differences notified by the absolute value sum calculation unit 114. Then, the searching method determination unit 115 assigns to the motion searching unit 102 a searching method to perform motion search using the global vector searching method.

In provisional encoding in the period T2, the provisional encoding of the G component as a P picture is performed again. That is, the provisional encoding of the G component is performed a third time using a time for which the encoding of the R or B component is possible. The motion searching unit 102 reads the image of the current macroblock from the input image area of the G component in the frame memory 101 again. Similarly, the motion searching unit 102 reads the image of a search window centered around the position of a global vector, of a reference image encoded during the T1 period from the image reference area of the G component, and performs motion search. Then, the motion searching unit 102 notifies the absolute value sum calculation unit 114 of the sum of absolute differences between the pixels of the current macroblock and the pixels of the reference image at the position of the motion vector. Encoding processing after motion search may be carried out or may not be carried out. When carried out before entropy encoding, the result of the encoding is not output as a stream.

The absolute value sum calculation unit 114 receives the sums of the absolute differences in units of macroblocks notified by the motion searching unit 102, and adds the sums corresponding to one frame of the G component. Then, the absolute value sum calculation unit 114 calculates the sums of absolute differences corresponding to one frame of the G component due to the global vector searching method, and notifies the searching method determination unit 115 of the calculated sums.

As described above, by provisional encoding, the result of the provisional intra-encoding of the G (in addition, R and B) component(s) of Frame0 is obtained in the period T1, and the sum of absolute differences of the G component of Frame1 due to three kinds of vector searching method is calculated in the period T2. Even if there are three kinds of vector searching methods, since a component to be encoded is only the G component, it is possible to reduce the burden of calculation. The searching method determination unit 115 compares these three sum of absolute differences due to the origin searching method, sum of absolute differences due to the peripheral MB vector searching method, and sum of absolute differences due to the global vector searching method. Then, a search range (searching method) resulting in the smallest sum of absolute differences is determined as the search method at the time of main encoding. That is, after the period T3, main encoding and recording processing are performed. In the present embodiment, the sum of absolute differences is used for the determination of the search method. However, as long as pixel differences between frames such as a mean square error (MSE) are used, any method may be used. Since encoding processing after the period T3 is the same as the above-described encoding method in the periods other than the provisional encoding period, its description is omitted. The method determined in the period T2 is used for the motion vector searching method.

Figure 9:
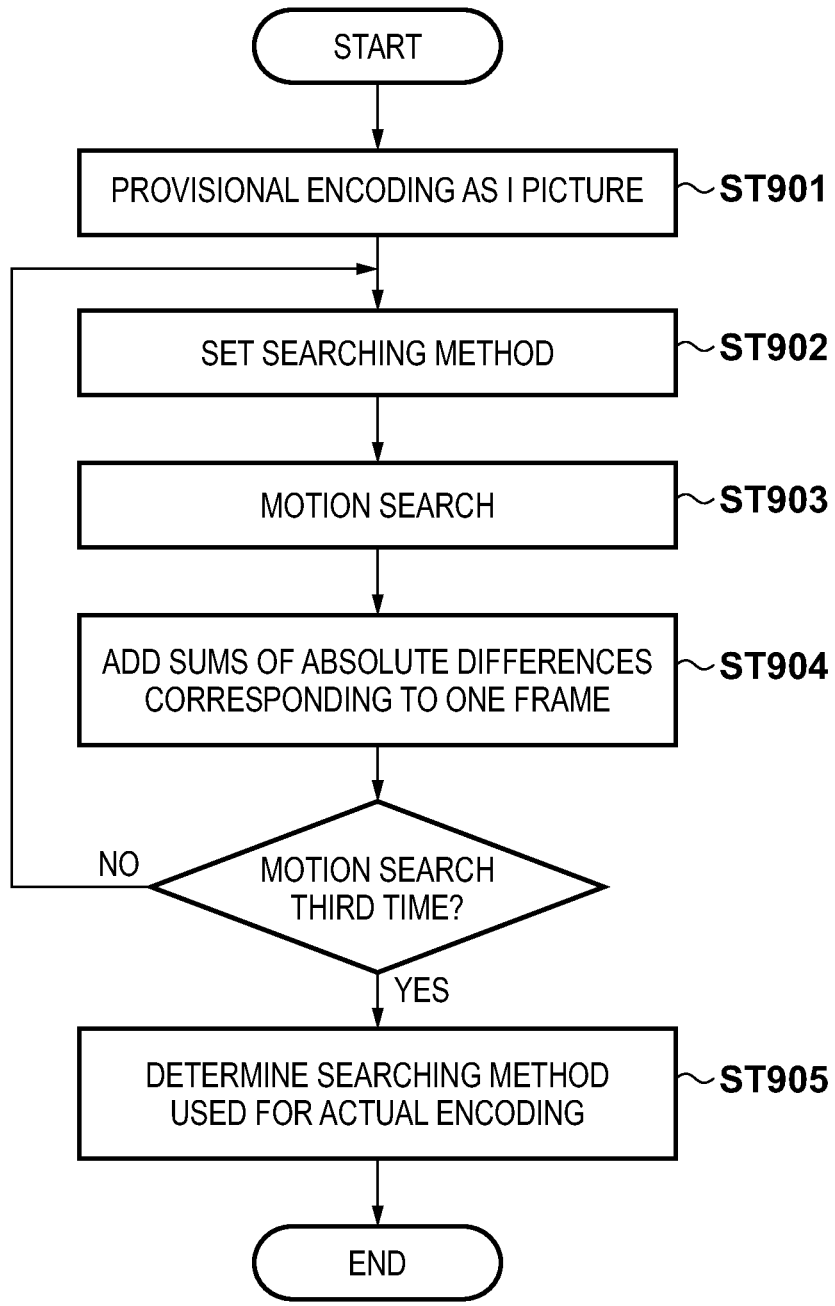
FIG. 9 is a flowchart illustrating an operation of a motion searching method determination method for a moving image encoding apparatus according to the first embodiment.

With reference to the flow chart in FIG. 9, the flow of the above processing will be summarized.

In step ST901 in FIG. 9, the G component of a first input frame is subjected to provisional encoding as an I picture.

In step ST902, one of a plurality of search methods is set. Then, in step ST903, motion search is performed on, as a reference frame, the I picture subjected to provisional encoding in step ST901. In step ST904, the sums of absolute differences corresponding to one frame are calculated, the calculated sums are held in a memory (not shown) in the searching method determination unit 115. While a searching method is set that is different from a method set before in step ST902, the above processing of steps ST902 to ST904 is repeated three times.

After the processing of steps ST902 to ST904 is repeated three times, in step ST905 a searching method is selected from among three performed searching methods such that the sums of absolute differences corresponding to one frame become smallest, and the searching method is determined as a searching method used at the time of main encoding.

As described above, it is possible to determine a suitable searching method for an input image by not encoding R, G, and B components sequentially during a single frame encoding period as at the time of normal encoding, but performing motion search due to three searching methods using only the G component, at the time of provisional encoding. In the present embodiment, examples given for different searching methods are the origin searching method, the peripheral MB vector searching method, the global vector searching method, but searching methods are not limited to these.

The reason why a search range is determined using only one component is because the properties of the images of color components in a frame at the same time are similar in many cases. In addition, the reason why not the R or B component but the G component is used is because the G component is the most visually conspicuous color among three components of R, G, and B. Since the provisional encoding period is a period for which encoding is not actually necessary, there is no increase in processing time and no increase in necessary frame areas by performing provisional encoding.

[Second Embodiment]

Figure 6:
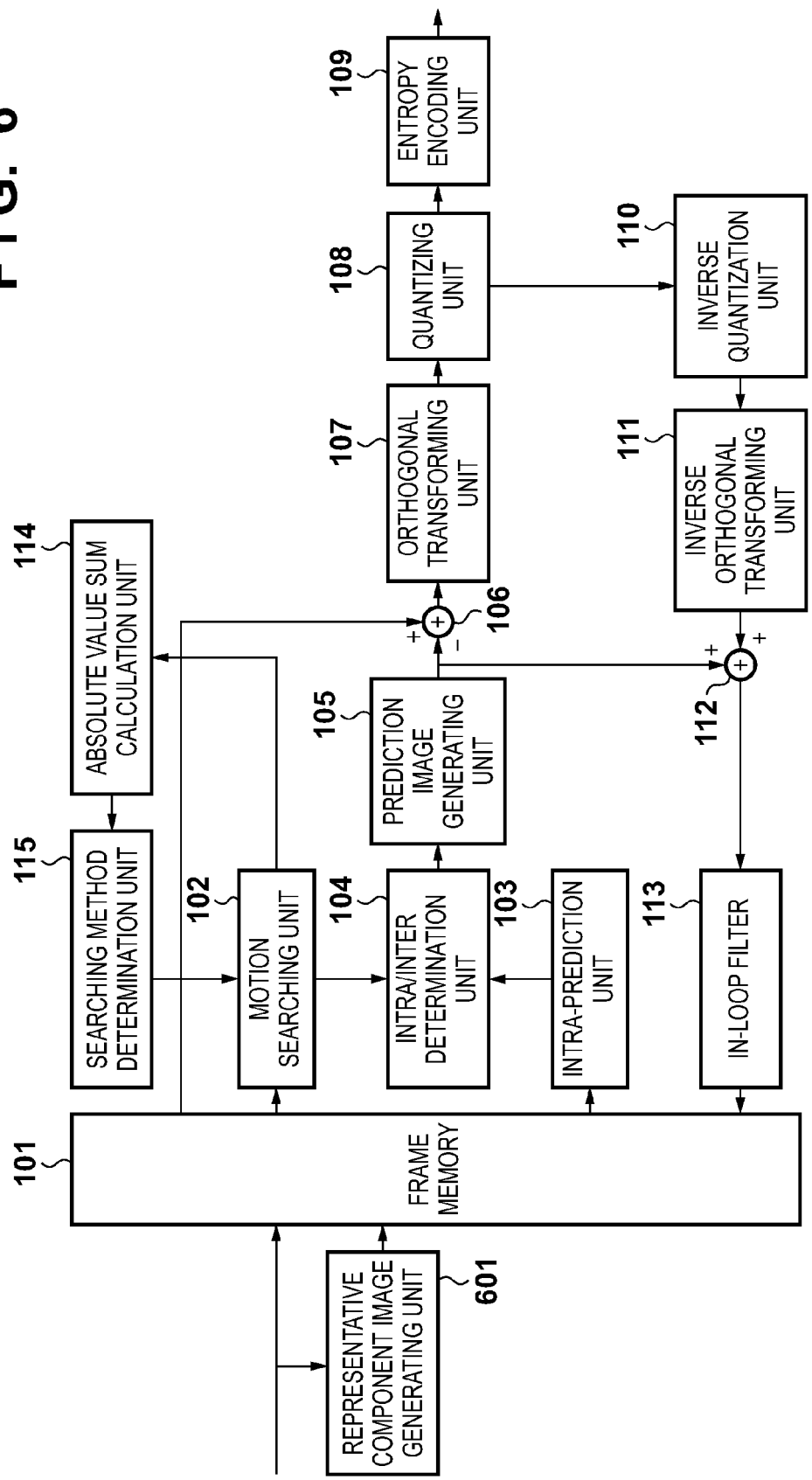
FIG. 6 is a block diagram showing a configuration example of a moving image encoding apparatus according to an embodiment.

A second embodiment of the present invention will be described with reference to FIG. 5, FIG. 6 and FIG. 7. FIG. 6 is a block diagram showing a configuration example of a moving image encoding apparatus according to the second embodiment. Aspects other than the aspect that the images stored in the frame memory 101 are different and a representative component image generating unit 601 is added are the same as those of the first embodiment. Therefore, component elements identical to component elements of first embodiment are marked with identical reference numerals.

Figure 7:
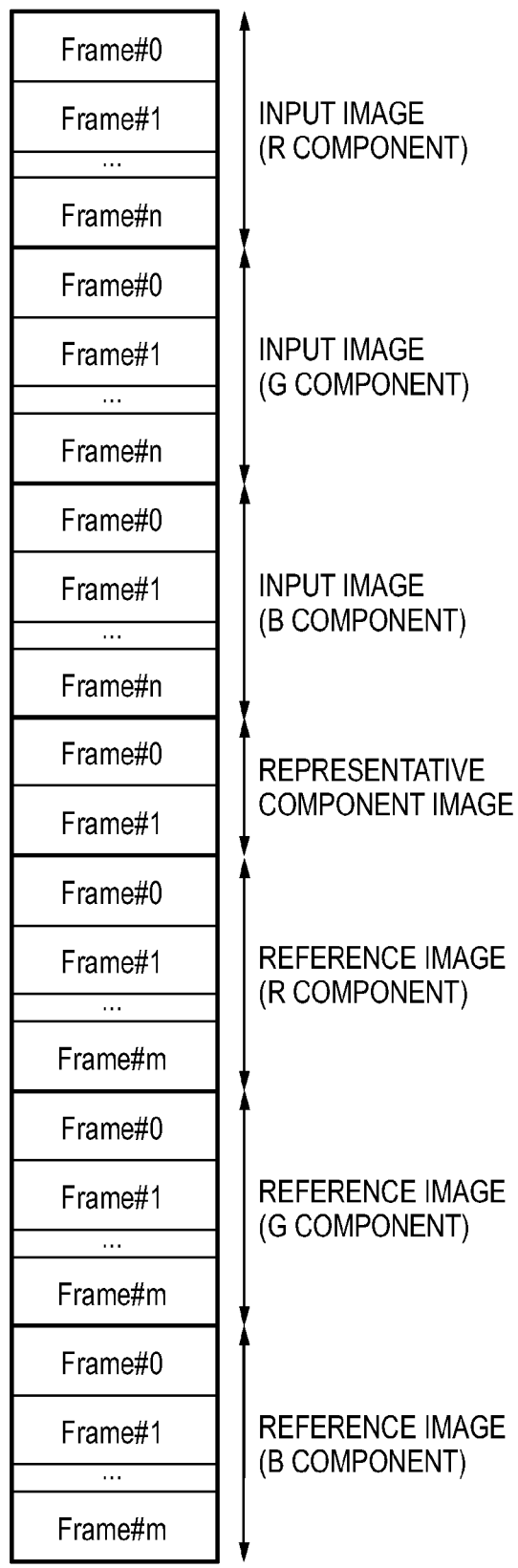
FIG. 7 is a block diagram showing an example of area division of a frame memory according to a second embodiment.

FIG. 7 is a diagram showing an example of area division of the frame memory 101 according to the second embodiment. The frame memory 101 is divided so that an input image area and a reference image area described below may store a plurality of frames for each component. Furthermore, the aspect that a representative component image area further described below is divided so as to be able to store two frames, in the second embodiment is different from that of the first embodiment.

The moving image R, G, and B signals of the 4:4:4 format obtained by imaging during the periods T0 and T1 immediately after the start of encoding in FIG. 5, are stored sequentially for each color component in the input image area in the frame memory 101. In addition, the R signal, G signal, and B signal are also input to the representative component image generating unit 601. The representative component image generating unit 601 calculates a luminance component from the R signal, G signal, and B signal, and generates a luminance component Y as a representative component signal. In addition, the representative component image generating unit 601 stores the images of representative component signals sequentially in the representative component image area in the frame memory 101.

If the pixel values of the R component, G component, and B component are defined as R, G, and B, respectively, then the pixel value (luminance) Y of the representative component signal is obtained by the following formula:

$$Y = 0.2126 \times R + 0.7152 \times G + 0.0722 \times B$$

A calculation formula for calculating the representative component signal may be an approximate formula such as, for example, $$Y = 0.25 \times R + 0.6875 \times G + 0.0625 \times B,$$

and the calculation formula for calculating the representative component signal is not particularly limited to the formulae indicated here.

In the second embodiment, processing is performed on the representative component Y instead of the G component of a representative color component used in provisional encoding indicated in the first embodiment.

That is, provisional encoding as an I picture in the period T1 and motion search in the period T2 are carried out with the representative component Y. Since aspects other than a change in color components used in provisional encoding are the same as those of the first embodiment, any description of the subsequent processing will be omitted.

As described above, by using, for motion search, a more visually conspicuous luminance component instead of the G color component with regard to color components used at the time of provisional encoding, it is possible to select a more suitable search method. Furthermore, color components in a main subject may be color components substituted for the G color component such that a skin color is used if a subject is a person, or the like. Any method for subject recognition in that case may be used.

[Third Embodiment]

Figure 8:
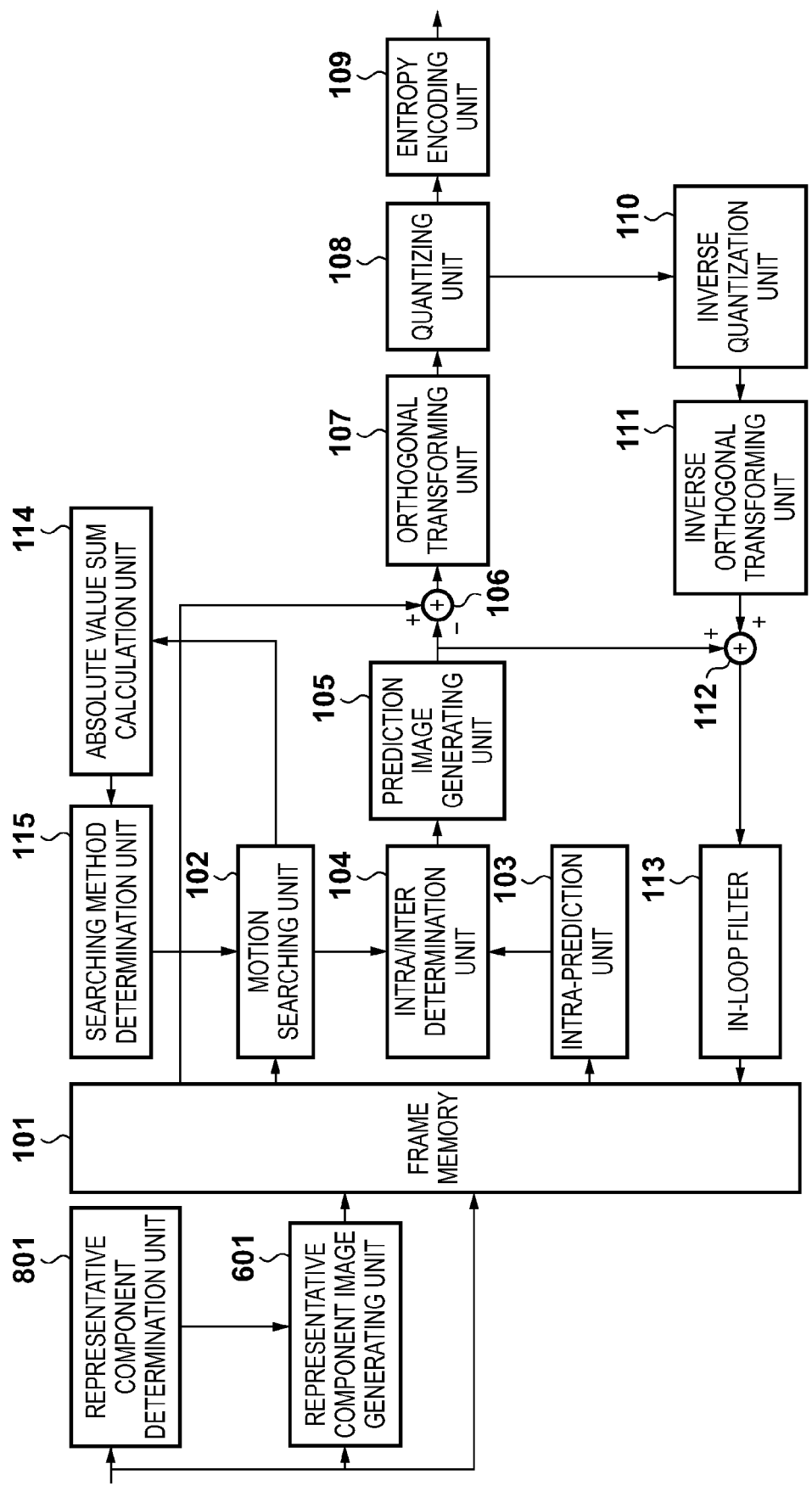
FIG. 8 is a block diagram showing a configuration example of a moving image encoding apparatus according to a third embodiment.

A third embodiment will be described with reference to FIG. 5 and FIG. 8. FIG. 8 is a block diagram showing a configuration example of a moving image encoding apparatus according to the third embodiment. Aspects other than the aspect that representative component images stored in the frame memory 101 are different and a representative component determination unit 801 is added are the same as those of the second embodiment.

The representative component determination unit 801 calculates dispersion values in the frames of respective components from moving image R, G, and B signals of the 4:4:4 format obtained by imaging, determines the component with the highest dispersion value as a representative component, and notifies the representative component image generating unit 601 of the result. The representative component image generating unit 601 generates a representative component image in accordance with the notified representative component, and stores the generated representative component image in the representative component image area in the frame memory 101.

Here, one component is selected as a representative component. However, the present invention is not limited to this. That is, the representative component image generating unit 601 may determine Kr, Kg, and Kb when the pixel values of the R component, G component, and B component is defined as R, G, and B, respectively, the pixel value of the representative component signal is defined as Y, and then calculation is performed by the following formula:

$$Y = Kr \times R + Kg \times G + Kb \times B.$$

In this case, Kr, Kg, and Kb are determined according to the ratio of the sizes of the dispersion values of respective components.

In the third embodiment, processing is performed with the representative component Y obtained by the above calculation as color components used in the provisional encoding given in the first embodiment.

That is, provisional encoding as an I picture in the period T1 and motion search in the period T2 is carried out with the representative component Y. Since the points other than a change in color components used in provisional encoding are the same as those of the first and second embodiments, any description of the subsequent processing will be omitted.

The amount of generated code frequently becomes larger at the time when color components with high dispersion values are encoded with the same quantization value. Therefore, it can be expected that the whole amount of generated code is reduced and encoding efficiency is enhanced by performing motion search attaching more importance to color components with high dispersion values, as in the third embodiment.

The method of the third embodiment is particularly effective when the respective dispersion values of R, G, and B have a wide range of variation. In many cases, since the dispersion values of R, G, and B come close to one another, in the normal case where variations in the dispersion values of R, G, and B are fully contained in the range of a preset threshold value, the method of the first or second embodiment is used. The first or second embodiment may be combined with the third embodiment such that the method of the third embodiment is used only in cases where variations in the dispersion values of R, G, and B are not fully contained in the range of the threshold value, for example.

[Fourth Embodiment]

In the above-described first to third embodiments, provisional encoding is performed, and during this processing, a method of searching motion vectors adopted for the main encoding is determined.

Generally, when focusing attention on controlling the amount of encoding in encoding processing, a certain determined initial-value is used. Therefore, it is possible that a problem occurs that encoding parameters at the time of provisional encoding are not suitable, depending on the images that are input. If encoding is performed using unsuitable quantization parameters, the problem occurs that the reliability of an encoding result, such as the amount of generated code or complexity, decreases. Therefore, in the fourth embodiment, the reliability of encoding parameters in provisional encoding is improved in encoding corresponding to the RGB 4:4:4 format. As a result, it is possible to improve image quality after the start of main encoding.

Figure 10:
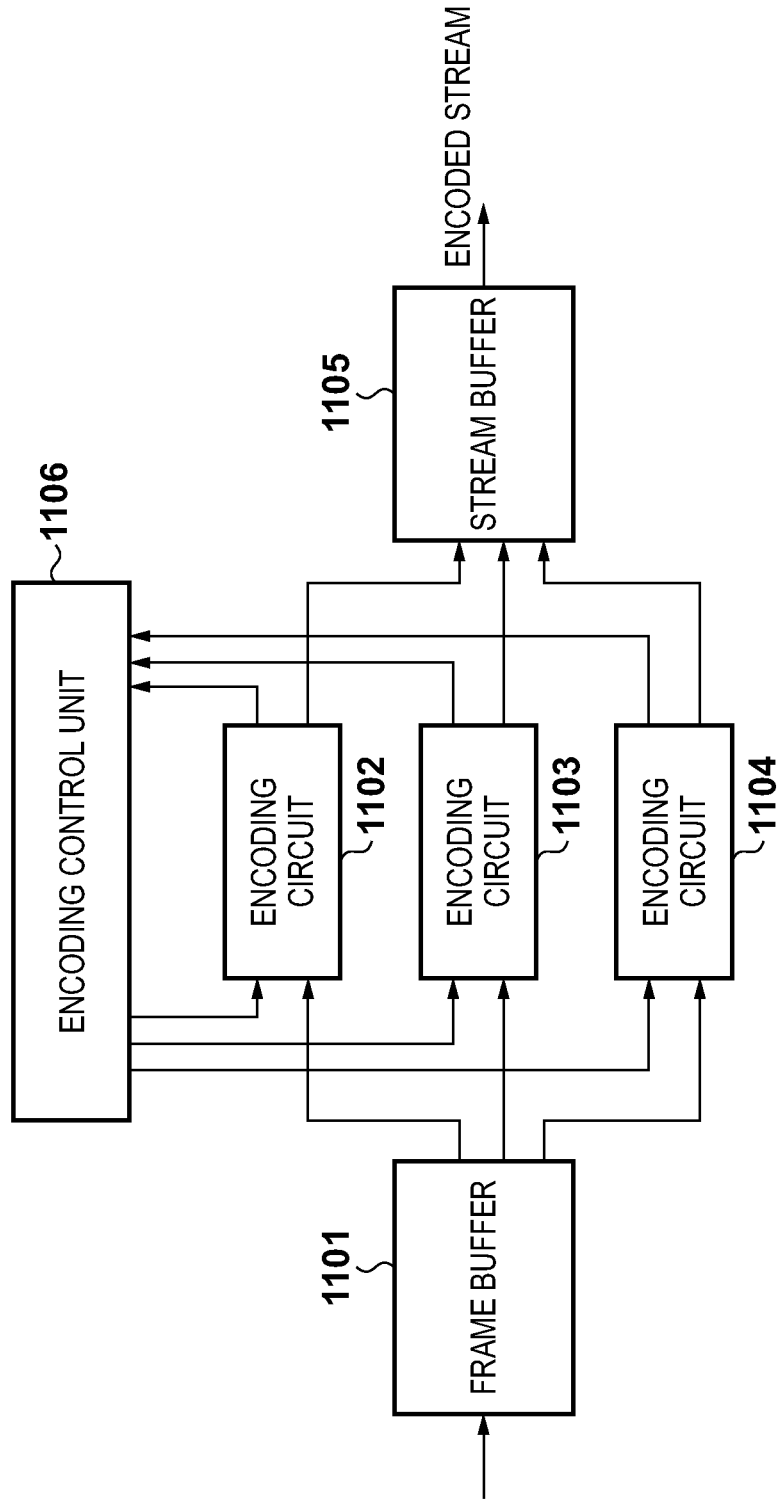
FIG. 10 is a block diagram of a moving image encoding apparatus according to a fourth embodiment.

FIG. 10 is a block diagram of a moving image encoding apparatus mounted on a video camera according to the fourth embodiment. Here, an encoding apparatus is illustrated that realizes an image of the RGB 4:4:4 format using the H.264 encoding method.

First, a normal main encoding operation (main encoding processing) will be described. Image data to be encoded is stored in a frame buffer 1101. Images of the R component, G component, and B component stored in the frame buffer 1101 may be independently output to an encoding circuit 1102, an encoding circuit 1103, and an encoding circuit 1104. For example, an R component, a G component, and a B component may also be output to the encoding circuit 1102, the encoding circuit 1103, and the encoding circuit 1104, respectively. Furthermore, in some cases, G components may also be output to all of the encoding circuit 1102, the encoding circuit 1103, and the encoding circuit 1104. At the time of the main encoding operation, an R component, a G component, and a B component are supplied to the encoding circuit 1102, the encoding circuit 1103, and the encoding circuit 1104, respectively. Then, the respective encoding circuits perform encoding operation on the input color components.

The encoding circuit 1102, the encoding circuit 1103, and the encoding circuit 1104 each encode one color component, and have the same configuration. Encoded streams resulting from encoding are output to a stream buffer 1105. In addition, information of the time of the encoding is output to an encoding control unit 1106. This information is the amount of generated code, an average quantization step size, for example.

The encoded streams of respective color components output from the encoding circuit 1102, the encoding circuit 1103, and the encoding circuit 1104 are stored collectively as one encoded stream in the stream buffer 1105 so as to be output.

The encoding control unit 1106 determines encoding parameters such as the target amount of code, and a quantization step size from the received encoded information, and outputs the encoding parameters to the encoding circuit 1102, the encoding circuit 1103, and the encoding circuit 1104.

Figure 11:
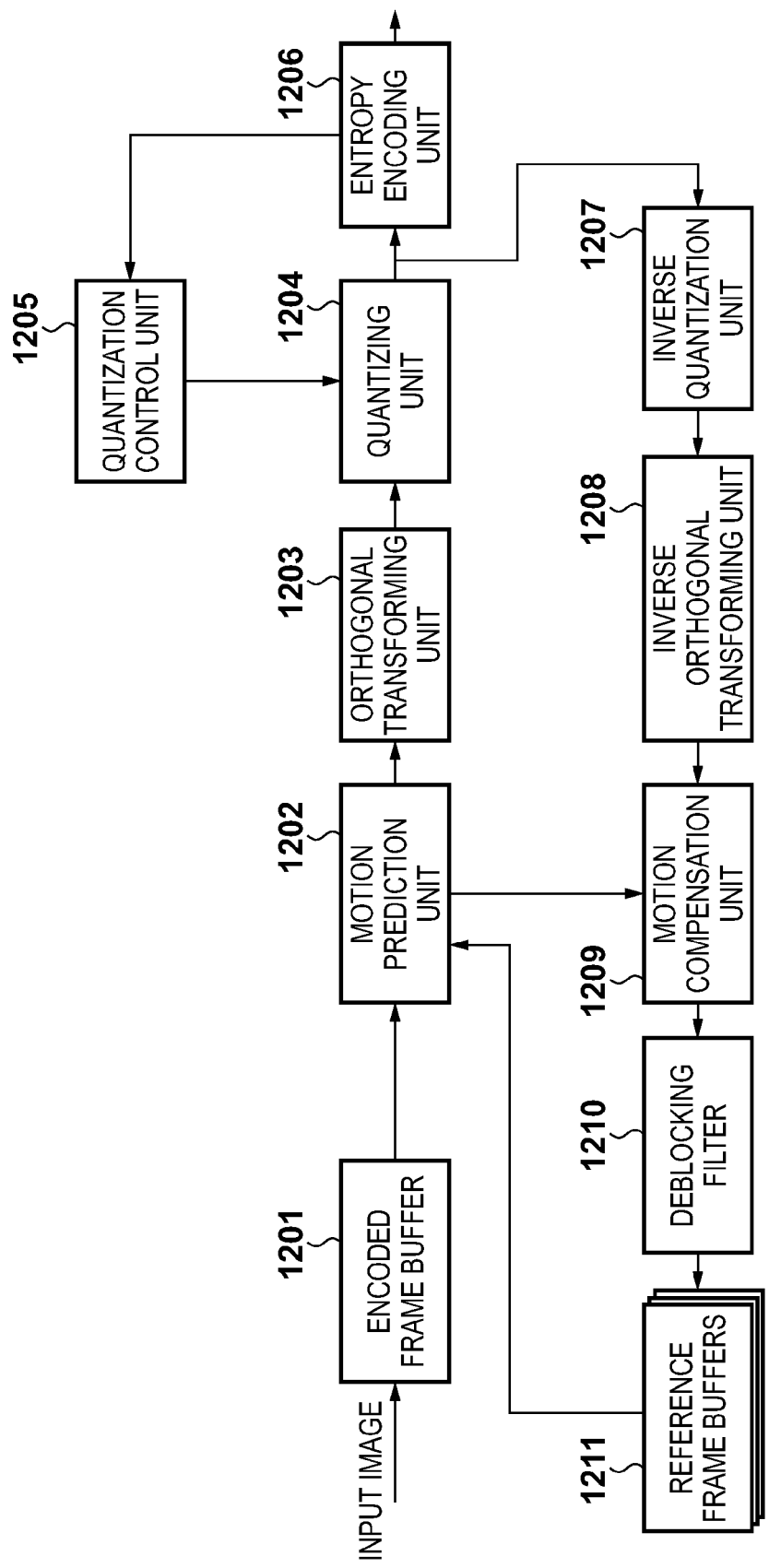
FIG. 11 is a block diagram of an encoding circuit according to the fourth embodiment.

The internal configuration of the encoding circuit 1102 is shown in FIG. 11, and hereinafter, its configuration and processing will be described. The other encoding circuit 1103, and encoding circuit 1104 are the same, and their further description is omitted. An encoded frame buffer 1201 and reference frame buffers 1211 are configured with the frame buffer 1101 in FIG. 10.

Image data to be encoded (image data of one color component) is input to the encoded frame buffer 1201. A motion prediction unit 1202 performs block matching between an image to be encoded stored in the encoded frame buffer 1201 and a reference image stored in the reference frame buffer 1211, and performs motion vector detection. Then, the motion prediction unit 1202 calculates pixel differences between the image to be encoded and a prediction image at a detected motion vector position, and outputs the difference image to the orthogonal transforming unit 1203. In addition, the prediction image at the motion vector detection position is also output to a motion compensation unit 1209 for local decoded image creation.

The orthogonal transforming unit 1203 performs a discrete cosine transform on the transmitted difference image, generates transformation coefficient data, and outputs the generated data to a quantizing unit 1204. The quantizing unit 1204 quantizes the transformation coefficient data transformed from the orthogonal transforming unit 1203 in accordance with a quantization step size output by a quantization control unit 1205. The quantized transformation coefficient is output to an entropy encoding unit 1206 for encoded stream creation, and an inverse quantization unit 1207 for local decoded image creation.

The entropy encoding unit 1206 performs zigzag scanning, alternate scanning, or the like on the quantized transformation coefficient, so as to perform variable-length encoding. The entropy encoding unit 1206 adds, to the variable-length encoded result, encoding method information such as a motion vector, a quantization step size, and division information on a block to be encoded, and generates an encoded stream. In addition, the entropy encoding unit 1206 calculates the amount of generated code for each block to be encoded at the time of encoding, and outputs the calculated amount to the quantization control unit 1205.

The quantization control unit 1205 determines a quantization step size. A code amount control method due to the target amount of code and a control method using a fixed quantization step size are methods of determining a quantization step size. In the code amount control method due to the target amount of code, a quantization step size is determined so as to become the target amount of code using the amount of generated code transmitted from the entropy encoding unit 1206, and the determined quantization step size is output to the quantizing unit 1204. At the time of main encoding, this target code amount control method due to the target amount of code is used.

In the control method using a fixed quantization step size, a corresponding quantization step size given from the encoding control unit 1106 for each picture at the start of encoding is always output to the quantizing unit 1204.

The inverse quantization unit 1207 performs inverse quantization on the quantized transformation coefficient transmitted from the quantizing unit 1204, and generates transformation coefficients for local decoding. These transformation coefficients are output to an inverse orthogonal transforming unit 1208. The inverse orthogonal transforming unit 1208 performs an inverse discrete cosine transform on the transmitted transformation coefficients, and generates a difference image. The generated difference image is output to the motion compensation unit 1209. The motion compensation unit 1209 generates an image for local decoding by adding the prediction image at the motion vector position transmitted from the motion prediction unit 1202, and the difference image transmitted from the inverse orthogonal transforming unit 1208. The generated image data is output to a deblocking filter unit 1210.

The deblocking filter unit 1210 performs deblocking filtering on the transmitted image data. The image data subjected to deblocking filtering is stored as a local decoded image in the reference frame buffer 1211. By this kind of operation, an encoded stream, and a local decoded image is created.

Hereinabove, although the encoding circuit 1102 has been described, the encoding circuit 1103 and the encoding circuit 1104 also have the same configuration and perform the same processing.

Next, the operation of the encoding control unit 1106 will be described. If the encoding control unit 1106 according to an embodiment detects that a user has input a recording start instruction with an operation unit (not shown), the encoding control unit 1106 performs provisional encoding on one color component, and determines an encoding parameter in the provisional encoding processing. Then, subsequently, main encoding is performed in accordance with the encoding parameter, and recording is performed. Since provisional encoding processing takes a very short time of a period of two frames as described below, it does not give the user any uncomfortable feeling.

Figure 12:
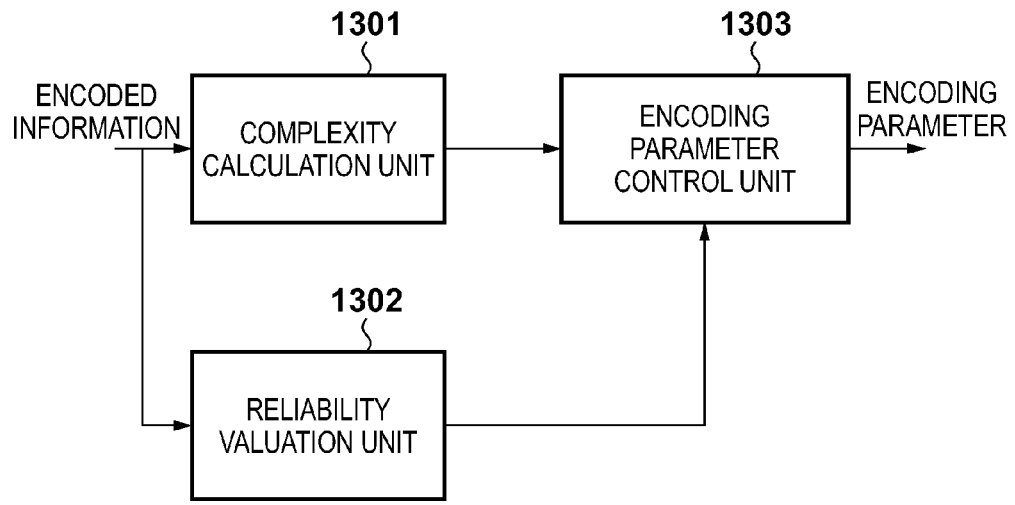
FIG. 12 is a block diagram of an encoding control unit according to the fourth embodiment.

FIG. 12 shows the configuration of the encoding control unit 1106 according to the fourth embodiment.

A complexity calculation unit 1301 calculates the complexity of an image to be encoded using encoded result information. A typical method of calculating image complexity is to operate the product of the amount of generated code, and an average quantization step size. Calculated image complexity is passed to an encoding parameter control unit 1303.

A reliability valuation unit 1302 calculates the reliability of image complexity. Various methods are considered as methods of evaluating reliability. For example, it is possible to obtain a high valuation on reliability in a case where the ratio of the amounts of generated code of an I picture, a P picture, and a B picture is close to a predetermined ratio when performing encoding by making the quantization step size constant. In addition, it is possible to obtain a high valuation on reliability in a case where the S/N ratio is high when controlling the amount of code by determining the target amount of code. Here, any method of calculating the reliability of image complexity may be used.

A reliability evaluation value of calculated image complexity is output to the encoding parameter control unit 1303.

The encoding parameter control unit 1303 calculates the target amount of code for code amount control using the image complexity.

A Test Model method is a typical method of controlling the amount of code. In this method, control is performed as described below so as to be substantially the same amount of code in each GOP.

If a target bit rate, the number of frames per second, and the number of frames of one GOP are defined as BitRate, PictureRate, and N, respectively, then the amount R of code assigned to the one GOP is given by the following formula:

$$R = (\text{BitRate}/\text{PictureRate}) \times N \quad (1)$$

The amount R of code of one GOP obtained by the formula (1) is assigned for each picture in one GOP.

Assignment to each picture is performed for each frame to be encoded as below. First, the image complexity of an I picture, a P picture, and a B picture is determined from encoding results of the same type of pictures already encoded, and is defined as Xi, Xp, and Xb, respectively.

Next, the frame numbers of the P pictures and the B pictures in the GOP that are not encoded are defined as Np, and Nb, respectively, and the setting ratios of the quantization step sizes of the P picture and the B picture to that of the I picture are defined as Kp and Kb, respectively.

The target amounts Ti, Tp, and Tb of code of each picture are determined by the following formulae (2) to (4):

$$Ti = \frac{R}{1\left|\frac{NpXp}{XiKp}\right|\frac{NbXb}{XiKb}} \quad (2)$$

$$Tp = \frac{R}{Np + \frac{NbKpXb}{XpKb}} \quad (3)$$

$$Tb = \frac{R}{Nb + \frac{NpKbXp}{XbKp}} \quad (4)$$

The amount of generated code actually generated in one frame is subtracted from the amount R of code every time the encoding of the frame is finished. In addition, the value of the formula (1) is added when encoding is started at the head of the GOP.

As described above, the encoding parameter control unit 1303 calculates the target amount of code of pictures.

Figure 13:
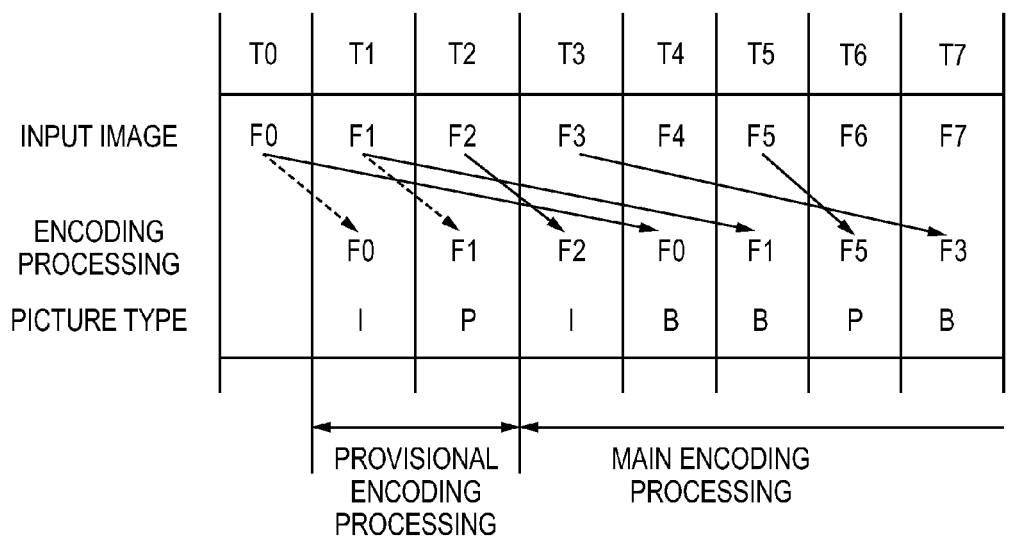
FIG. 13 is a view showing encoding processing timing according to the fourth embodiment.

Next, provisional encoding processing will be described with reference to FIG. 13. FIG. 13 shows the timing of provisional encoding processing for each picture. The horizontal axis represents the time axis, and one section represents one frame period relative to an image frame. Furthermore, T0 to T7 represent respective frame periods.

F0 to F7 represent input frames stored in the encoded frame buffer 1201. F0 represents a frame that is first input when receiving an instruction of recording start.

If encoded pictures are arranged in order of encoding, then the GOP configuration in the fourth embodiment is "IBBPBBPBB". If encoded pictures are arranged in order of input, then the GOP configuration is "BBIBBPBBP". The arrows in FIG. 13 associate a period in which an image is input with a period in which encoding is performed, and represent a flow of images. Particularly, the dashed line arrows represent the corresponding relationship between a frame to be subjected to provisional encoding and its period.

Since provisional encoding processing is carried out only to obtain information on encoding results, an encoded stream obtained here is not recorded. Furthermore, a control method due to a fixed quantization step size using a predetermined value is used for provisional encoding processing. Moreover, main encoding processing is performed following provisional encoding, and an encoded stream obtained here is recorded.

First, F0, which is the first image immediately after the start of encoding, is input to the encoded frame buffer 1201 during the T0 period.

Next, the image F1 is input to the encoded frame buffer 1201 during the T1 period. At this time, provisional encoding is performed on the image F0 input earlier, as an I picture. The amount of generated code that is a result of provisional encoding is output to the encoding control unit 1106.

Subsequently, the image F2 is input to the encoded frame buffer 1201 during the T2 period. At this time, provisional encoding is performed on the image F1 input earlier, as a P picture. The amount of generated code that is a result of provisional encoding is output to the encoding control unit 1106. These T1 period and T2 period are periods of provisional encoding processing.

The encoding control unit 1106 calculates the image complexity Xi of the I picture and the image complexity Xp of the P picture, using the amounts of generated code of the images F0 and F1, and an average quantization step size. Because of a control method due to a fixed quantization step size, a quantization step size specified at the time of provisional encoding corresponds to the average quantization step size, as it is. The image complexity Xb of a B picture is calculated by multiplying Xp by a predetermined coefficient.

The target amount of code for main encoding processing is calculated using Xi, Xp, and Xb thus calculated. After the T3 period, main encoding processing is performed using the calculated target amount of code.

Next, a provisional encoding method according to the present embodiment will be described. A feature of the present embodiment is that provisional encoding processing is not separately performed on the R component, G component, and B component. Instead, by selecting one representative component from among three colors, provisional encoding processing is performed on the representative component using three kinds of encoding parameters by three encoding circuits 1102 to 1104. Since it is conceivable that each component has a strong correlation, the accuracy of provisional encoding is improved by not performing provisional encoding on each component using one kind of encoding parameter, but performing provisional encoding on one color component using three kinds of encoding parameters.

In the T1 period and T2 period of provisional encoding processing periods the frame memory 101 outputs a G component as a representative component to all of the encoding circuit 1102, the encoding circuit 1103, and the encoding circuit 1104.

Provisional encoding is performed on the same input image using a different quantization step size in each provisional encoding circuit. For example, Qi0 serving as a quantization step size for I pictures and Qp0 serving as a quantization step size for P pictures are set as encoding parameters 1 in the encoding circuit 1102. Qi1 serving as a quantization step size for I pictures and Qp1 serving as a quantization step size for P pictures are set as encoding parameters 2 in the encoding circuit 1103. Qi2 serving as a quantization step size for I pictures and Qp2 serving as a quantization step size for P pictures are set as encoding parameters 3 in the encoding circuit 1104.

All Qi0, Qi1, and Qi2 have different values, and all Qp0, Qp1, and Qp2 also have different values. For example, those values have the relationships of the following formulae (5) and (6).

$$Qi0 < Qi1 < Qi2 \tag{5}$$

$$Qp0 < Qp1 < Qp2 \tag{6}$$

Provisional encoding is thus performed in the T1 period and T2, and the amount of generated code that is the result is output to the encoding control unit 1106.

The encoding control unit 1106 receives the amounts of generated code from the encoding circuits, and calculates the image complexity from the amounts of generated code and quantization step sizes at the time of provisional encoding in the complexity calculation unit 1301. Furthermore, the reliability valuation unit 1302 calculates the reliability of the complexity.

The calculated image complexity and reliability of each encoding parameter are output to the encoding parameter control unit 1303.

The encoding parameter control unit 1303 selects image complexity with the highest reliability, of the reliability of the image complexity. The target amount of code for main encoding processing is calculated using the image complexity.

Specifically, the amounts of code of I pictures of the G component generated by the encoding circuit 1102, the encoding circuit 1103, and the encoding circuit 1104 in the period T1 of provisional encoding processing are defined as Ai1, Ai2, and Ai3. In addition, the amounts of code of P pictures of the G component generated by the encoding circuit 1102, the encoding circuit 1103, and the encoding circuit 1104 in the period T2 are defined as Ap1, Ap2, and Ap3. At this time, the ratios R1 to R3 of the amounts of code of an I picture to a P picture in each circuit are determined.

$$R1 = Ai1/Ap1$$

$$R2 = Ai2/Ap2$$

$$R3 = Ai3/Ap3$$

Then, it is determined which ratio is closest to a preset ideal ratio R0 of the amounts of code of an I picture to a P picture, from among these three ratios. For example, "i" corresponding to R0/Ri (i=1, 2, or 3) that is closest to "1.00" is determined.

Here, suppose that i=2, i.e., R2 is closest to the ideal ratio R0. In this case, the encoding parameter control unit 1303 determines the target amounts Ti, Tp, and Tb of code of respective I, P, and B pictures, by applying, to the above-described formulae (2) to (4), the complexity Xi, Xp, and Xb calculated by the complexity calculation unit 1301 based on the amount of encoded data obtained from the second encoding circuit 1103. After this, main encoding processing is performed in accordance with these target amounts Ti, Tp, and Tb of code.

As described above, in the fourth embodiment, by selecting one representative component from among three color components at the time of provisional encoding and performing provisional encoding on the representative component using three different kinds of encoding parameter, it is possible to improve the accuracy of the provisional encoding result. By calculating the target amount of code for main encoding processing using a high accuracy provisional encoding result, the accuracy of the target amount of code is improved, and encoded data having a favorable balance between the amount of generated code and image quality can be generated.

In the fourth embodiment, although a control method due to a fixed quantization step size is used at the time of provisional encoding, a code amount control method due to the target amount of code may be used. Furthermore, although operation in parallel using three encoding circuits has been described in the fourth embodiment, the configuration is not limited to this, and the present invention may be configured such that processing is performed three times for each color component using one encoding circuit.

[Fifth Embodiment]

Figure 14:
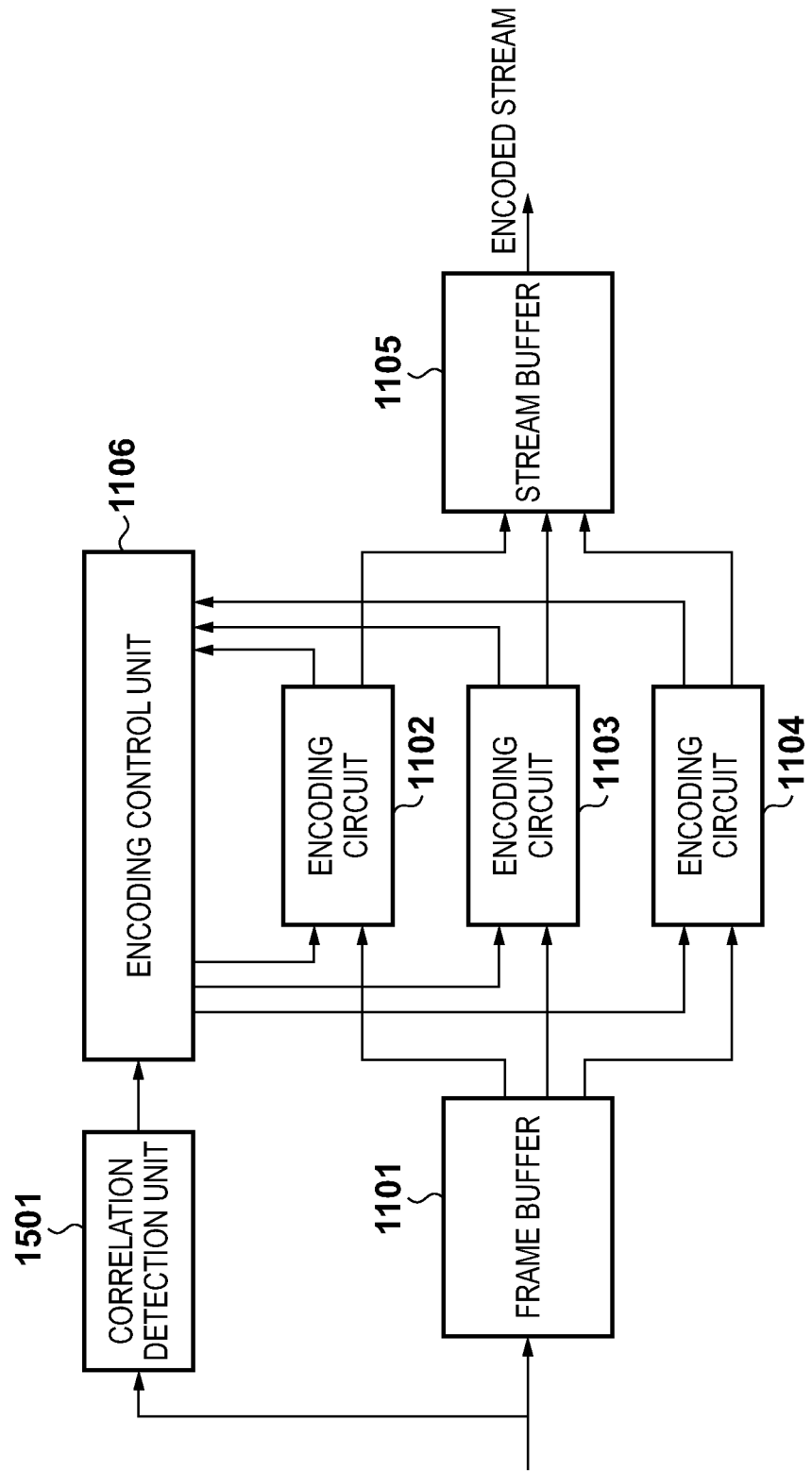
FIG. 14 is a block diagram of a moving image encoding apparatus according to a fifth embodiment.

FIG. 14 shows a system configuration of an encoding apparatus according to a fifth embodiment. Here, only the difference from the fourth embodiment will be described in detail. The difference from the fourth embodiment is to select a provisional encoding method due to whether each color component has a strong correlation by detecting correlation between each color component in advance. Therefore, in the fifth embodiment, a correlation detection unit 1501 is provided.

An image is input that is the same as an image to be encoded in the correlation detection unit 1501. It is detected whether the degree of correlation is high among the respective color components of the R component, G component and B component aiming at the leading image subjected to provisional encoding among input images.

In addition, in accordance with this, the image F0 is input to the correlation detection unit 1501 during the T0 period in FIG. 13, and it is detected whether the degree of correlation is high among the respective color components of the R component, G component and B component. Then, the detection result is input to the encoding control unit 1106.

Various methods are considered as methods of detecting the degree of correlation. For example, the standard deviations σr, σg, and σt of the R, G, and B components are determined, and if the relationship with a preset threshold value Th1 satisfies the following formulae, then it is determined that the degree of correlation is high.

$$|\sigma r - \sigma g| \leq Th1$$

$$|\sigma r - \sigma b| \leq Th1$$

$$|\sigma g - \sigma b| \leq Th1$$

Furthermore, by obtaining the difference values among pixel values in a determined unit of block, and comparing their total values of the entire image, it is possible to detect whether the correlation is strong. Here, any method of detecting the degree of correlation may be used.

The encoding control unit 1106 selects a provisional encoding method due to a detection result of the degree of the correlation among each color component. If the correlation among each color component is high, provisional encoding is performed using three different kinds of encoding parameter, by selecting one representative component from among three color components, as described in the fourth embodiment. Since the correlation among each color component is high, it is possible to use, for main encoding processing, the result of provisional encoding using a representative component.

If the correlation among each color component is not high, provisional encoding is performed using a predetermined encoding parameter for each color component, and the results are used for main encoding processing for each color component. Since the correlation among each color component is not high, provisional encoding for each color component can yield a result better than provisional encoding using a representative component.

Figure 15:
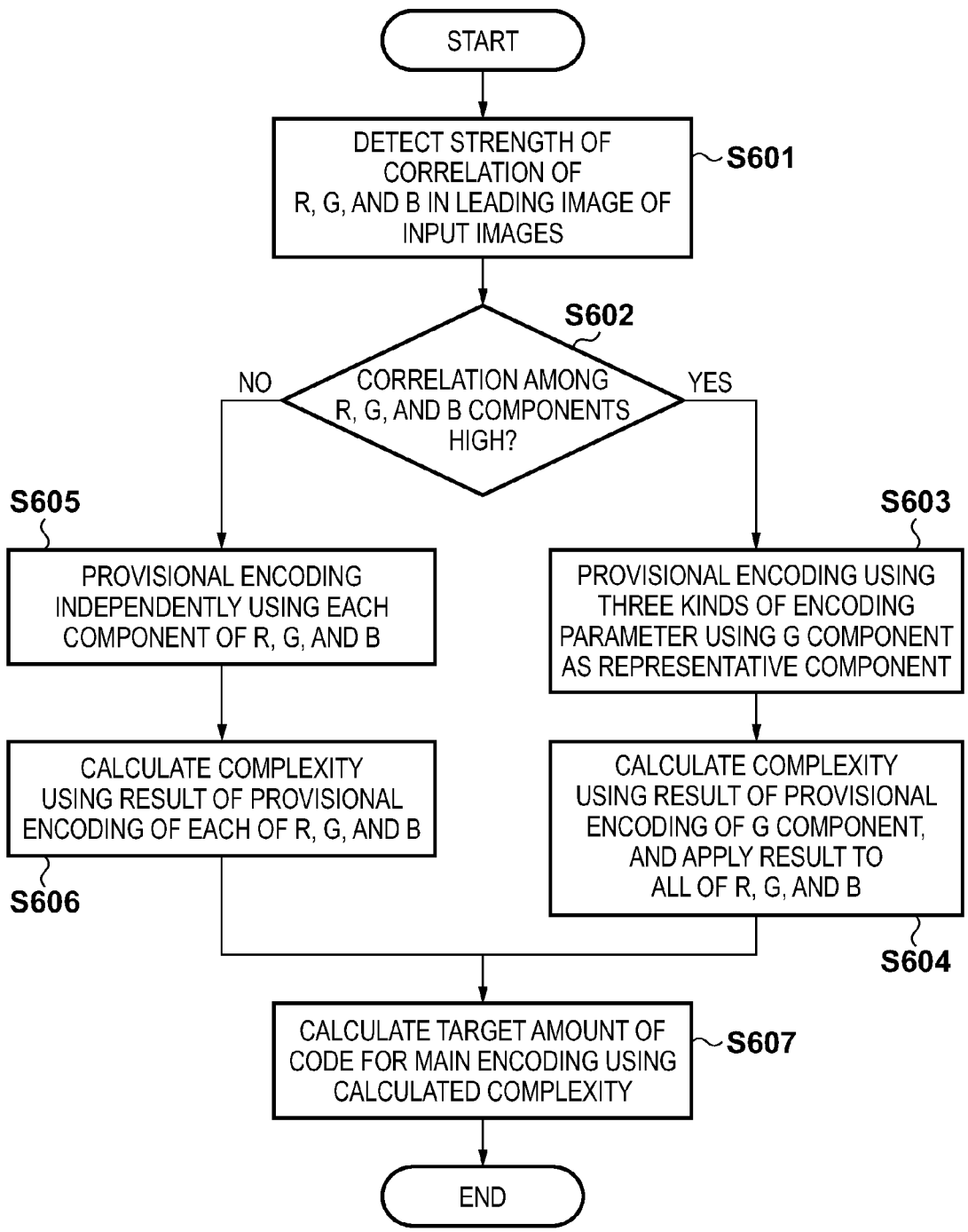
FIG. 15 is a flowchart showing a processing procedure according to the fifth embodiment.

The above-described operation is illustrated in the flow chart in FIG. 15 and will be described.

First, it is detected whether correlation is high among the respective color components of the R component, G component and B component using the leading image of input images (S601). If the correlation among each color component is high (S602), provisional encoding is performed using three kinds of encoding parameter using the G component as a representative component (S603). Complexity is calculated using a provisional encoding result with the highest reliability among the provisional encoding results. The complexity is applied as the complexity of the R component, G component, and B component (S604).

If the correlation among each color component is not high, provisional encoding is independently performed on the R component, G component, and B component, respectively (S605). Complexity is independently calculated from the respective provisional encoding results of the R component, G component, and B component (S606).

Then, the target amount of code for main encoding is calculated using the calculated complexity, and main encoding processing is performed (S607).

As described above, by selecting a provisional encoding method in accordance with the strength of the correlation among each color component of an image, it is possible to perform provisional encoding suitable for an input image. By adequately performing provisional encoding, the accuracy of calculation of the target amount of code for main encoding processing becomes higher, and it is possible to obtain favorable images.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-054133, filed Mar. 15, 2013 which is hereby incorporated by reference herein in its entirety.

What is claimed is:

1. A moving image encoding apparatus that encodes each frame image constituting a moving image independently for each color component, the moving image encoding apparatus comprising:
a provisional encoding unit that performs, by obtaining motion vectors in accordance with a plurality of mutually different search ranges of image data of one color component, provisional encoding on a preset number of frame images at an initial stage at a time when an encoding start instruction is given; and
a determination unit that determines, from the plurality of search ranges, the search range with the smallest error vector, as a search range for a motion vector, of each color component in main encoding processing carried out following the provisional encoding.

2. The moving image encoding apparatus according to claim 1,
wherein the determination unit calculates a mean square error or a sum of absolute differences between pixel values of a pixel block to be encoded and pixel values of a reference block obtained from the search ranges, and determines the search range resulting in the reference block having the smallest value, as a search range for a motion vector of each color component in main encoding processing.

3. The moving image encoding apparatus according to claim 1,
wherein each of the frames constituting the moving image is made up of data of three color components, namely an R component, a G component, and a B component, and
wherein the provisional encoding unit performs provisional encoding on the image data of the G component among the three color components.

4. The moving image encoding apparatus according to claim 1,
wherein each of the frames constituting the moving image is made up of data of three color components, namely an R component, a G component, and a B component, and
wherein the provisional encoding unit includes a generating unit that generates data of a luminance component Y from the data of the R component, the G component, and the B component, and performs provisional encoding on the data of the luminance component Y generated by the generating unit.

5. The moving image encoding apparatus according to claim 1,
wherein each of the frames constituting the moving image is made up of data of three color components, namely an R component, a G component, and a B component, and
wherein the provisional encoding unit: includes a representative component determination unit that evaluates the data of the R component, the G component, and the B component, in accordance with a preset valuation function to determine a representative component; and performs provisional encoding on color component data determined by the representative component determination unit.

6. A moving image encoding apparatus that encodes each frame image constituting a moving image independently for each color component, the moving image encoding apparatus comprising:
a provisional encoding unit that subjects, in accordance with mutually different quantization parameters, image data of one color component to provisional encoding of a preset number of frame images at an initial stage at a time when an encoding start instruction is given;
a calculation unit that calculates an image complexity for each of the quantization parameters as well as a reliability of the respective complexity, based on encoded data obtained by provisional encoding with the provisional encoding unit; and
a determination unit that determines an encoding parameter at a time of encoding the moving image based on the complexity with the highest reliability calculated by the calculation unit.

7. The moving image encoding apparatus according to claim 6,
wherein the quantization parameter is a quantization step size.

8. The moving image encoding apparatus according to claim 6,
wherein the determination unit determines target coding amounts of I, P, and B pictures.

9. The moving image encoding apparatus according to claim 6,
wherein the provisional encoding unit includes a determination unit that determines whether or not a degree of correlation is high by determining the degree of correlation among image data of each of the color component, and comparing a preset threshold value with the degree of correlation, and performs provisional encoding on the one color component in a case where it is determined by the determination unit that the degree of correlation is high.

10. A moving image encoding apparatus that encodes each frame image constituting a moving image independently for each color component, the moving image encoding apparatus comprising:
an encoding unit that encodes each of the frame images by intra-encoding or inter-encoding;
a provisional encoding unit that, for at least two frame images at an initial stage of encoding by the encoding unit, performs provisional encoding on the first frame image by intra-encoding during a first period, and performs provisional encoding on the second frame image which is different from the first frame image by inter-encoding with reference to a reference image based on the first frame image during a second period following the first period; and
a determination unit that determines a method in main encoding performed during a third period following the second period in accordance with a result of provisional encoding due to the inter-encoding by the provisional encoding unit,
wherein the provisional encoding unit performs provisional encoding due to a plurality of times of inter-encoding on a specific component of the second frame image during the second period.

11. The moving image encoding apparatus according to claim 10,
wherein the determination unit determines a method of searching a motion vector at a time of the main encoding.

12. The moving image encoding apparatus according to claim 10,
wherein each of the frames constituting the moving image is made up of data of three color components, namely an R component, a G component, and a B component, and
wherein the provisional encoding unit performs provisional encoding due to a plurality of times of inter-encoding on the image data of the G component among the three color components.

13. The moving image encoding apparatus according to claim 10,
wherein each of the frames constituting the moving image is made up of data of three color components, namely an R component, a G component, and a B component, and
wherein the provisional encoding unit includes a generating unit that generates data of a luminance component Y from the data of the R component, the G component, and the B component, and performs provisional encoding due to a plurality of times of inter-encoding on the data of the luminance component Y generated by the generating unit.

14. The moving image encoding apparatus according to claim 10,
wherein each of the frames constituting the moving image is made up of data of three color components, namely an R component, a G component, and a B component, and
wherein the provisional encoding unit: includes a representative component determination unit that evaluates the data of the R component, the G component, and the B component, in accordance with a preset valuation function to determine a representative component; and performs provisional encoding due to a plurality of times of inter-encoding on color component data determined by the representative component determination unit.

15. A method of controlling a moving image encoding apparatus that encodes each frame image constituting a moving image independently for each color component, the method comprising:
a provisional encoding step of performing, by obtaining motion vectors in accordance with a plurality of mutually different search ranges of image data of one color component, provisional encoding on a preset number of frame images at an initial stage at a time when an encoding start instruction is given; and
a determination step of determining, from the plurality of search ranges, in the provisional encoding step, the search range with the smallest error vector, as a search range for a motion vector, of each color component in main encoding processing carried out following the provisional encoding.

16. A non-transitory computer-readable storage medium that stores, in a computer, a program for executing each of the steps in the method of controlling a moving image encoding apparatus according to claim 15, by being read and executed by the computer.

17. A method of controlling a moving image encoding apparatus that encodes each frame image constituting a moving image independently for each color component, the method comprising:

a provisional encoding step of subjecting, in accordance with mutually different quantization parameters, image data of one color component to provisional encoding of a preset number of frame images at an initial stage at a time when an encoding start instruction is given;
a calculation step of calculating an image complexity for each of the quantization parameters as well as a reliability of the respective complexity, based on encoded data obtained by provisional encoding in the provisional encoding step; and
a determination step of determining an encoding parameter at a time of encoding the moving image based on the complexity with the highest reliability calculated in the calculation step.

18. A non-transitory computer-readable storage medium that stores, in a computer, a program for executing each of the steps in the method of controlling a moving image encoding apparatus according to claim 17, by being read and executed by the computer.

19. A method of controlling a moving image encoding apparatus that encodes each frame image constituting a moving image independently for each color component, the method comprising:
an encoding step of encoding each of the frame image by intra-encoding or inter-encoding:
a provisional encoding step of, for at least two frame images at an initial stage of encoding by the encoding step, performing provisional encoding on the first frame image by intra-encoding during a first period, and performing provisional encoding on the second frame image which is different from the first frame image by inter-encoding with reference to a reference image based on the first frame image during a second period following the first period; and
a determination step of determining a method in main encoding performed during a third period following the second period in accordance with a result of provisional encoding due to the inter-encoding by the provisional encoding step,
wherein the provisional encoding step performs provisional encoding due to a plurality of times of inter-encoding on a specific component of the second frame image during the second period.

20. A non-transitory computer-readable storage medium that stores, in a computer, a program for executing each of the steps in the method of controlling a moving image encoding apparatus according to claim 19, by being read and executed by the computer.

* * * * *